(No Model.)

J. H. COX.
LEMON GRATER.

No. 462,626. Patented Nov. 3, 1891.

Witnesses.
Robert Everett
Dennis Sumby

Inventor.
Jennie H. Cox.
By James L. Norris.
Atty.

THE NORRIS PETERS CO., PHOTO-LITHO., WASHINGTON, D. C.

UNITED STATES PATENT OFFICE.

JENNIE H. COX, OF WINFIELD, KANSAS.

LEMON-GRATER.

SPECIFICATION forming part of Letters Patent No. 462,626, dated November 3, 1891.

Application filed July 3, 1891. Serial No. 398,392. (No model.)

*To all whom it may concern:*

Be it known that I, JENNIE H. COX, a citizen of the United States, residing at Winfield, in the county of Cowley and State of Kansas, have invented new and useful Improvements in Lemon-Graters, of which the following is a specification.

The object of my invention is to provide a convenient, durable, and easily-operated machine for grating or rasping off the outer aromatic rind of a lemon uniformly and without liability of cutting into and obtaining the undesirable bitter principle of the inner white rind.

To this end my invention consists in a machine or implement comprising a suitable frame provided with a handle, a rotary screw-shaft mounted on said frame and provided at one end with an operating-handle and at or near its other end with a fork or prongs, on which the lemon to be grated is impaled, a grater having a hinged connection with the machine-frame and supported thereby adjacent to the position occupied by the lemon, and a spring by which the grater is held in yielding contact with the lemon while the latter is rotated and moved forward and backward in contact with the grating-surface.

The invention also consists in the construction and combination of parts in a lemon-grater, as hereinafter described and claimed.

Figure 1:
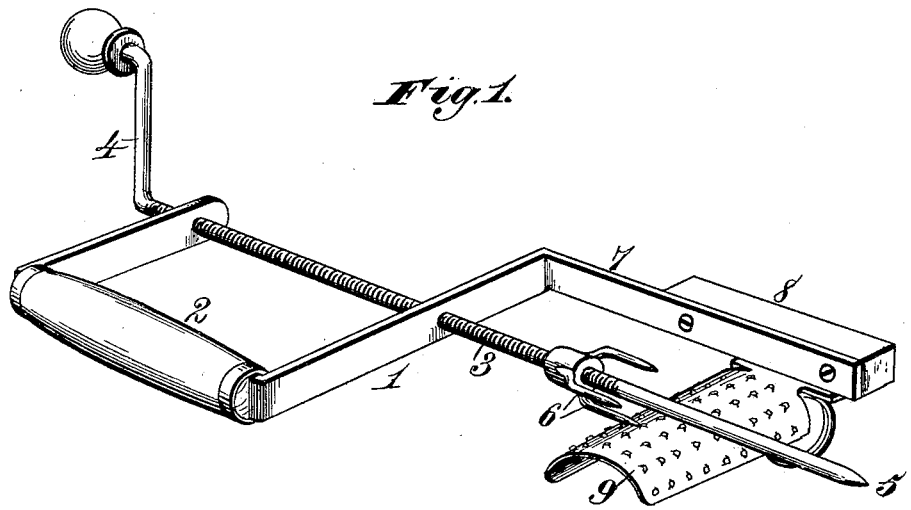
Figure 2:
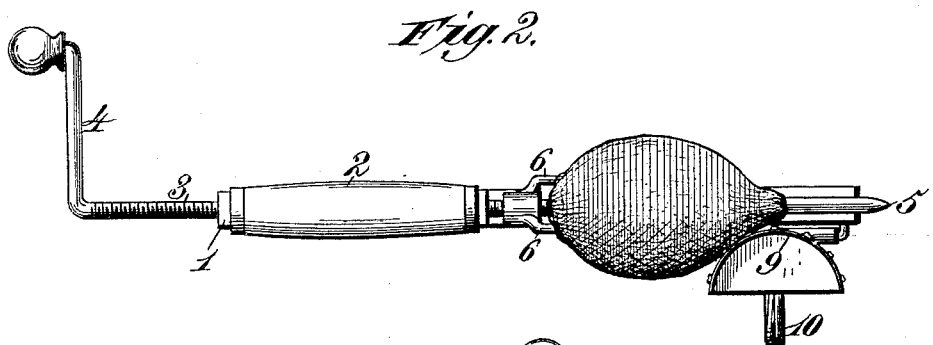
Figure 3:
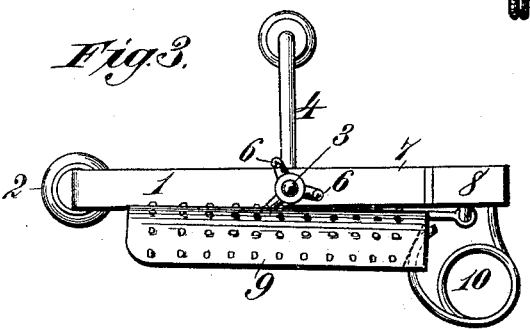

In the annexed drawings, illustrating the invention, Figure 1 is a perspective of the lemon-grater. Fig. 2 is a side elevation of the same, representing a lemon in position on the fork when the operating-shaft is at its rearward limit. Fig. 3 is an end view of the device.

Referring to the drawings, the numeral 1 designates a frame having a bail-shaped handle 2, in the arms of which is mounted a rotary screw-shaft 3, having at its rear end a crank-handle 4, by which it can be operated so as to cause the threaded portion of said shaft to be moved forward and backward in the bearings. The forward portion of the rotary screw-shaft 3 is provided with a pointed end 5 to impale a lemon, and on said shaft near its pointed end is secured a fork comprising prongs 6, that are so arranged as to pierce the end of the lemon and hold it firmly in such a manner as to prevent its turning loosely on the shaft.

The frame of the machine or implement comprises a bracket-arm 7, that is connected to and is preferably integral with one arm of the bail-shaped handle 2, and the forward portion of this bracket-arm 7 may be integral with or attached to a block or support 8, to which one end of the grating device 9 is pivotally attached. This grating device or grater 9 may be of any suitable form, preferably semi-cylindrical or concavo-convex, and is hinged at one end to the block 8, which also supports a spring 10, arranged to press the grater with a yielding force in contact with the lemon impaled on the shaft 3, so that as said shaft is moved forward or back the lemon will be carried with a rotary motion over the grater and evenly grated against the roughened grating-surface. The spring-pressed grater will yield sufficiently to cause its convexed surface to follow the contour of the fruit and under the pressure of the spring exert a uniform grating action on the entire surface of the lemon from end to end. After the lemon has been carried past the grater 9, by rotating the shaft 3 in one direction the motion of the shaft can be reversed to move the lemon in an opposite direction against the grater, this operation being continued until a sufficient quantity of grated material has been obtained.

The implement is easily operated and will give better results than can be obtained by holding the lemon in the hand while grating it.

What I claim as my invention is—

1. In a lemon-grater, the combination of a frame, a rotary screw-shaft mounted on said frame and provided at one end with an operating-handle and at or near its other end with means for impaling and firmly supporting a lemon, a grater having a hinged connection with the machine-frame, and a spring by which the grater is held in yielding contact with the lemon, substantially as described.

2. In a lemon-grater, the combination of a frame provided with a handle, a rotary screw-shaft mounted on said frame and provided with a fork to hold a lemon, a grater having a hinged connection with the machine-frame, and a spring to hold the grater in yielding contact with the lemon, substantially as described.

In testimony whereof I have hereunto set my hand and affixed my seal in presence of two subscribing witnesses.

JENNIE H. COX. [L. S.]

Witnesses:
J. M. READY,
W. M. READY.